United States Patent
Sankaran

(10) Patent No.: US 7,391,915 B1
(45) Date of Patent: Jun. 24, 2008

(54) CACHE FRIENDLY METHOD FOR PERFORMING INVERSE DISCRETE WAVELET TRANSFORM

(75) Inventor: Jagadeesh Sankaran, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 536 days.

(21) Appl. No.: 11/202,887

(22) Filed: Aug. 12, 2005

(51) Int. Cl.
*G06K 9/36* (2006.01)

(52) U.S. Cl. ...................................... 382/248

(58) Field of Classification Search ......... 382/232–233, 382/239–240, 248; 375/240.11, 240.19; 708/317, 400–401
See application file for complete search history.

(56) References Cited

U.S. PATENT DOCUMENTS

| | | | |
|---|---|---|---|
| 6,567,081 B1 * | 5/2003 | Li et al. | 345/419 |
| 6,996,281 B2 * | 2/2006 | Boliek et al. | 382/236 |
| 7,024,046 B2 * | 4/2006 | Dekel et al. | 382/240 |
| 7,149,362 B2 * | 12/2006 | Lafruit et al. | 382/240 |
| 7,236,637 B2 * | 6/2007 | Sirohey et al. | 382/240 |
| 7,283,684 B1 * | 10/2007 | Keenan | 382/276 |

* cited by examiner

*Primary Examiner*—Jose L. Couso
(74) *Attorney, Agent, or Firm*—Robert D. Marshall, Jr.; W. James Brady; Frederick J. Telecky, Jr.

(57) ABSTRACT

This invention is a method for inverse Wavelet transform using a breadth-first output data calculation which uses input data to calculate at least one output data for each iteration of a software loop even if the same input data is used in a later iteration for calculating other output data. This reduces data movement between memory and the data processor core thus reducing the possibility of cache misses and memory stalls due to access conflicts. The input data and computed output data are preferably stored as subwords packed within data words in memory. In inverse Wavelet transformation this method performs vertical spatial frequency expansion and horizontal spatial frequency expansion for each level of Wavelet encoding. This invention arranges data flow providing a more efficient use of memory bandwidth and cache space than other known methods.

7 Claims, 5 Drawing Sheets

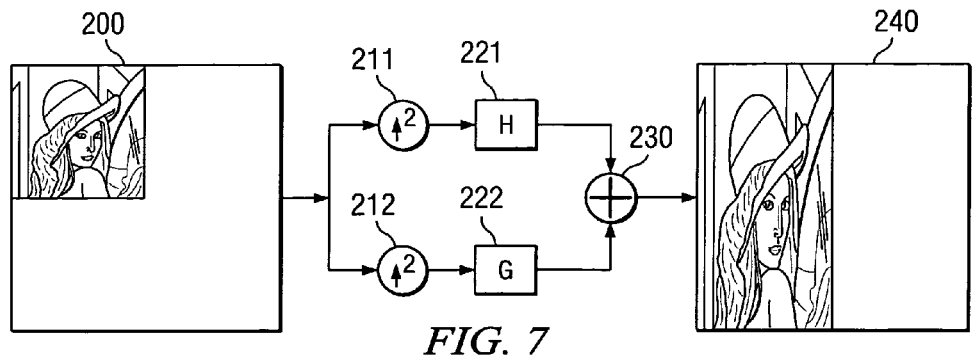
FIG. 7
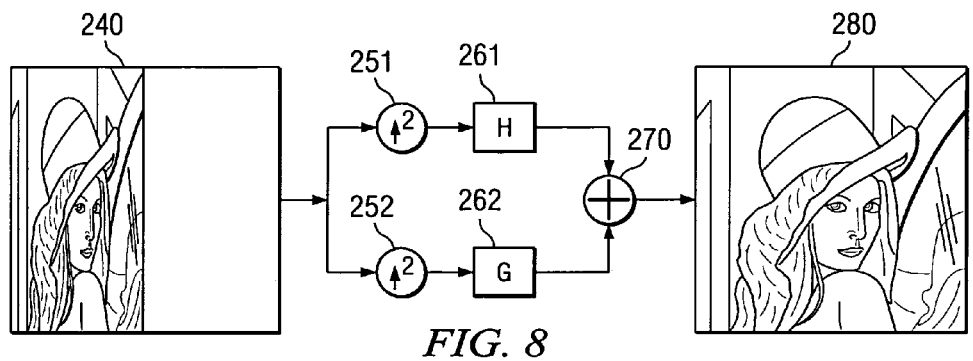
FIG. 8
FIG. 10
(PRIOR ART)
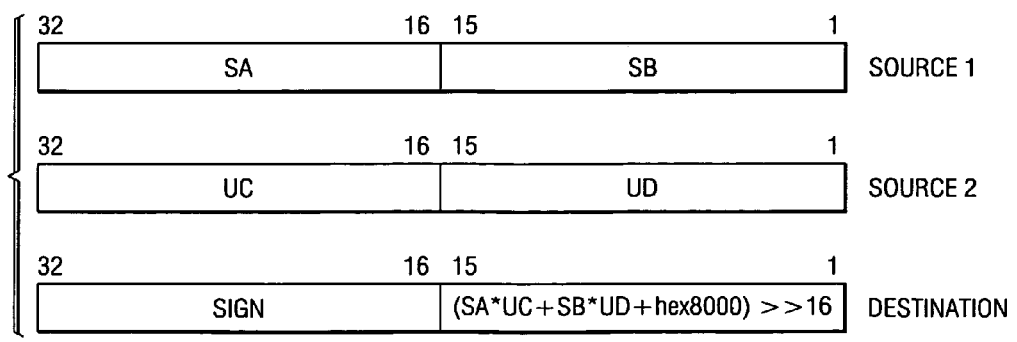

CACHE FRIENDLY METHOD FOR PERFORMING INVERSE DISCRETE WAVELET TRANSFORM

TECHNICAL FIELD OF THE INVENTION

The technical field of this invention is digital data encoding and more particularly inverse discrete wavelet transform coding.

BACKGROUND OF THE INVENTION

Wavelet encoding of image data transforms the image from a pixel spatial domain into a mixed frequency and spatial domain. In the case of image data the wavelet transformation includes two dimensional coefficients of frequency and scale. FIGS. 1 to 6 illustrate the basic technique of wavelet image transformation. The two dimensional array of pixels is analyzed X and Y directions and a set for transformed data that can be plotted in respective X and Y frequency. FIG. 1 illustrates transformed data 100 with the upper left corner the origin of the X and Y frequency coordinates. This transformed data is divided into four quadrant subbands. Quadrant 101 includes low frequency X data and low frequency Y data denoted as LL. Quadrant 102 includes low frequency X data and high frequency Y data denoted LH. Quadrant 103 includes high frequency X data and low frequency Y data denoted HL. Quadrant 104 includes high frequency X data and high frequency Y data denoted HH.

Organizing the image data in this fashion with a wavelet transform permits exploitation of the image characteristics for data compression. It is found that most of the energy of the data is located in the low frequency bands. The image energy spectrum generally decays with increasing frequency. The high frequency data contributes primarily to image sharpness. When describing the contribution of the low frequency components the frequency specification is most important. When describing the contribution of the high frequency components the time or spatial location is most important. The energy distribution of the image data may be further exploited by dividing quadrant 101 into smaller bands. FIG. 2 illustrates this division. Quadrant 101 is divided into subquadrant 111 denoted LLLL, subquadrant 112 denoted LLLH, subquadrant 113 denoted LLHL and subquadrant 114 denoted LLHH. As before, most of the energy of quadrant 101 is found in subquadrant 111. FIG. 3 illustrates a third level division of subquadrant 111 into subquadrant 121 denoted LLLLLL, subquadrant 122 denoted LLLLLH, subquadrant 123 denoted LLLLHL and subquadrant 124 denoted LLLLHH. FIG. 4 illustrates a fourth level division of subquadrant 121 into subquadrants 131 denoted LLLLLLLL, subquadrant 132 denoted LLLLLLLH, subquadrant 133 denoted LLLLLLHL and subquadrant 134 denoted LLLLLLHH.

For an n-level decomposition of the image, the lower levels of decomposition correspond to higher frequency subbands. Level one represents the finest level of resolution. The n-th level decomposition represents the coarsest resolution. Moving from higher levels of decomposition to lower levels corresponding to moving from lower resolution to higher resolution, the energy content generally decreases. If the energy content of level of decomposition is low, then the energy content of lower levels of decomposition for corresponding spatial areas will generally be smaller. There are spatial similarities across subbands. A direct approach to use this feature of the wavelet coefficients is to transmit wavelet coefficients in decreasing magnitude order. This would also require transmission of the position of each transmitted wavelet coefficient to permit reconstruction of the wavelet table at the decoder. A better approach compares each wavelet coefficient with a threshold and transmits whether the wavelet value is larger or smaller than the threshold. Transmission of the threshold to the detector permits reconstruction of the original wavelet table. Following a first pass, the threshold is lowered and the comparison repeated. This comparison process is repeated with decreasing thresholds until the threshold is smaller than the smallest wavelet coefficient to be transmitted. Additional improvements are achieved by scanning the wavelet table in a known order, with a known series of thresholds. Using decreasing powers of two seems natural for the threshold values.

FIG. 5 illustrates scale dependency of wavelet coefficients. Each wavelet coefficient has a set of four analogs in a next lower level. In FIG. 19, wavelet coefficients B, C and D are shown with corresponding quads B1, B2, B3, B4, C1, C2, C3, C4, D1, D2, D3 AND D4. Each of these wavelet coefficients has a corresponding quad in the next lower level. As shown in FIG. 5: wavelet coefficients B1, B2, B3 and B4 each have corresponding quads B1, B2, B3 and B4 in the next lower level; wavelet coefficient C2 has a corresponding quad C2; and wavelet coefficient D2 has a corresponding quad D2.

FIG. 6 illustrates an example Morton scanning order and a corresponding set of wavelet coefficients used in a coding example. The Morton scanning retains the same order for each 4 by 4 block in increasing scale. In the wavelet coefficient example H indicates the coefficient is greater than the threshold and L indicates the coefficient is less than the threshold. The encoded data in this example is "HHLH HLLH LLLL HLHL."

Use of the wavelet compressed data requires a reversal of the encoding process called an inverse discrete wavelet transform.

SUMMARY OF THE INVENTION

This invention is a method for inverse Wavelet transform using a breadth-first output data calculation. This breadth-first computation results in fewer intermediate variables that need to be stored. Such a breadth-first approach used input data to calculate at least one output data for each iteration of a software loop even if the same input data is used in a later iteration for calculating other output data. This reduces data movement between memory and the data processor core thus reducing the possibility of cache misses and memory stalls due to access conflicts. The input data and computed output data are preferably stored as subwords packed within data words in memory.

In inverse Wavelet transformation this method performs vertical spatial frequency expansion and horizontal spatial frequency expansion for each level of Wavelet encoding. The software loop schedules multiplications between input data and corresponding non-zero filter coefficients and does not schedule multiplications between input data and corresponding zero filter coefficients. The technique calculates output data from input data and corresponding even filter coefficients, and then calculates output data from input data and corresponding odd filter coefficients.

This method preferably employs a data processor having data cache of a predetermined memory capacity. The image is processes as sub-band stripes having a size selected corresponding to the memory capacity of the data cache.

In many cases, the filter coefficients include at least one pair of equal filter coefficients. For these equal pair of filter coefficients, the method adds the corresponding pairs of input data and multiplies the by said corresponding equal filter coefficient. In the preferred embodiment this addition employs an instruction that simultaneously and separately adds differing portions of packed input data generating separate packed sums.

This invention proposes a more efficient multiplier utilization involving no additional buffering in performing inverse discrete wavelet transforms. This invention arranges data flow providing a more efficient use of memory bandwidth and cache space than other known methods.

BRIEF DESCRIPTION OF THE DRAWINGS

These and other aspects of this invention are illustrated in the drawings, in which:

FIG. 7 illustrates a vertical stage of the inverse wavelet transform (Prior Art);

FIG. 8 illustrates a horizontal stage of the inverse wavelet transform (Prior Art);

FIG. 10 illustrates the operation of an advanced multiply-sum instruction that is useful in this invention (Prior Art);

DETAILED DESCRIPTION OF PREFERRED EMBODIMENTS

Figure 1:
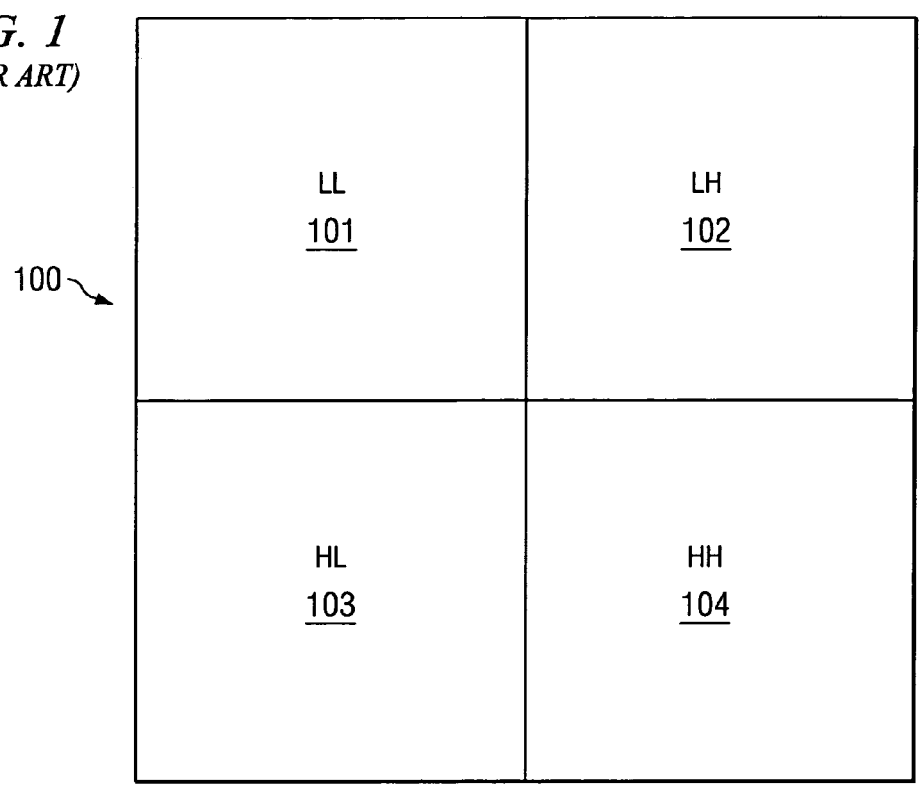
FIG. 1 illustrates transformed wavelet data divided into four quadrant subbands (Prior Art)
Figure 2:
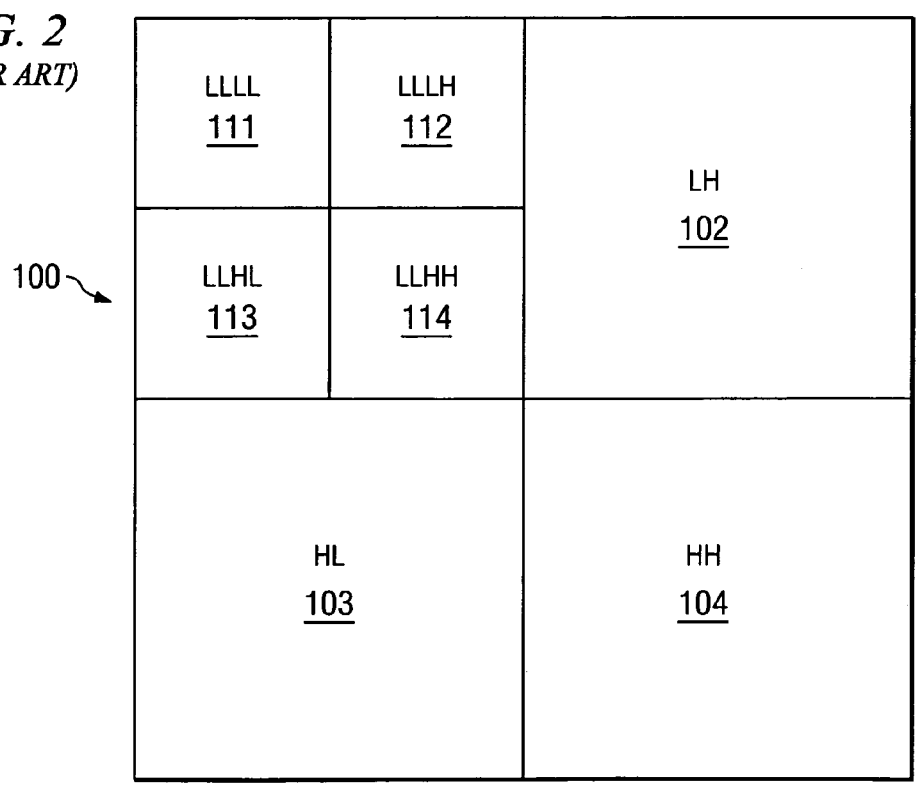
FIG. 2 illustrates further division of quadrant 201 into smaller bands (Prior Art)
Figure 3:
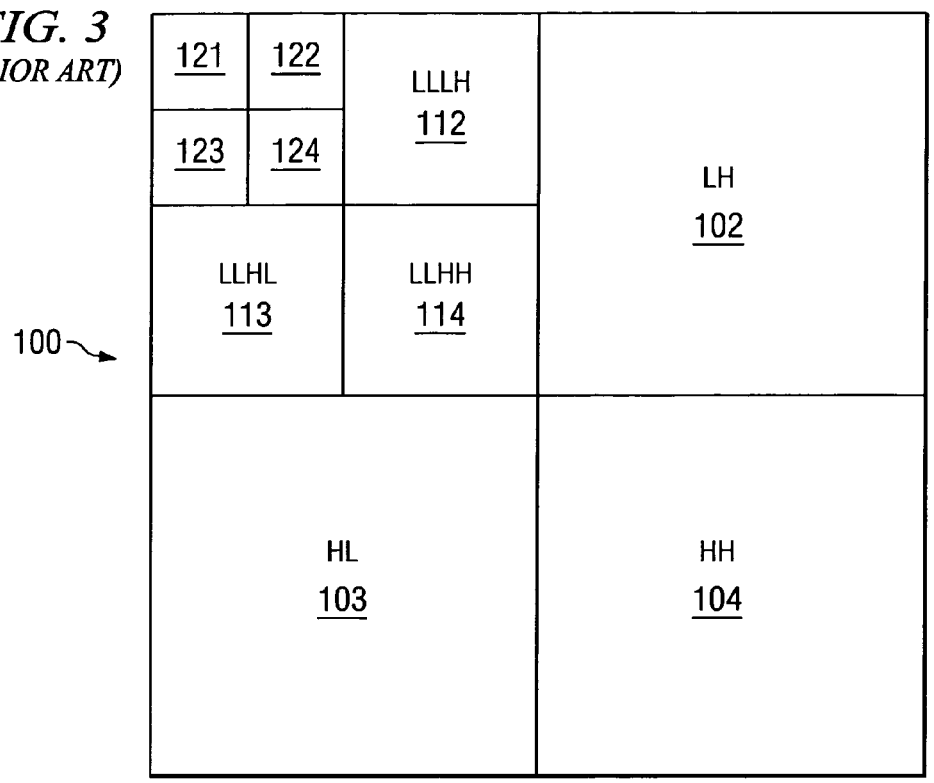
FIG. 3 illustrates a third level division of subquadrant 211 into yet smaller bands (Prior Art)
Figure 4:
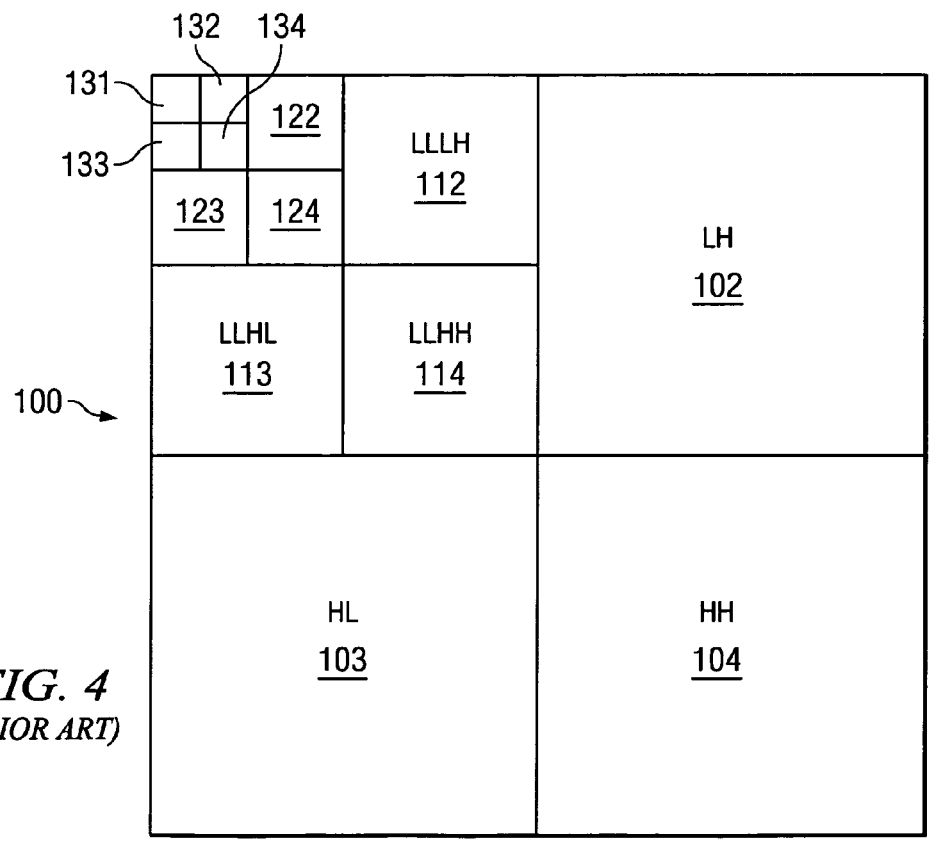
FIG. 4 illustrates a fourth level division of subquadrant 221 into still smaller bands (Prior Art)
Figure 5:
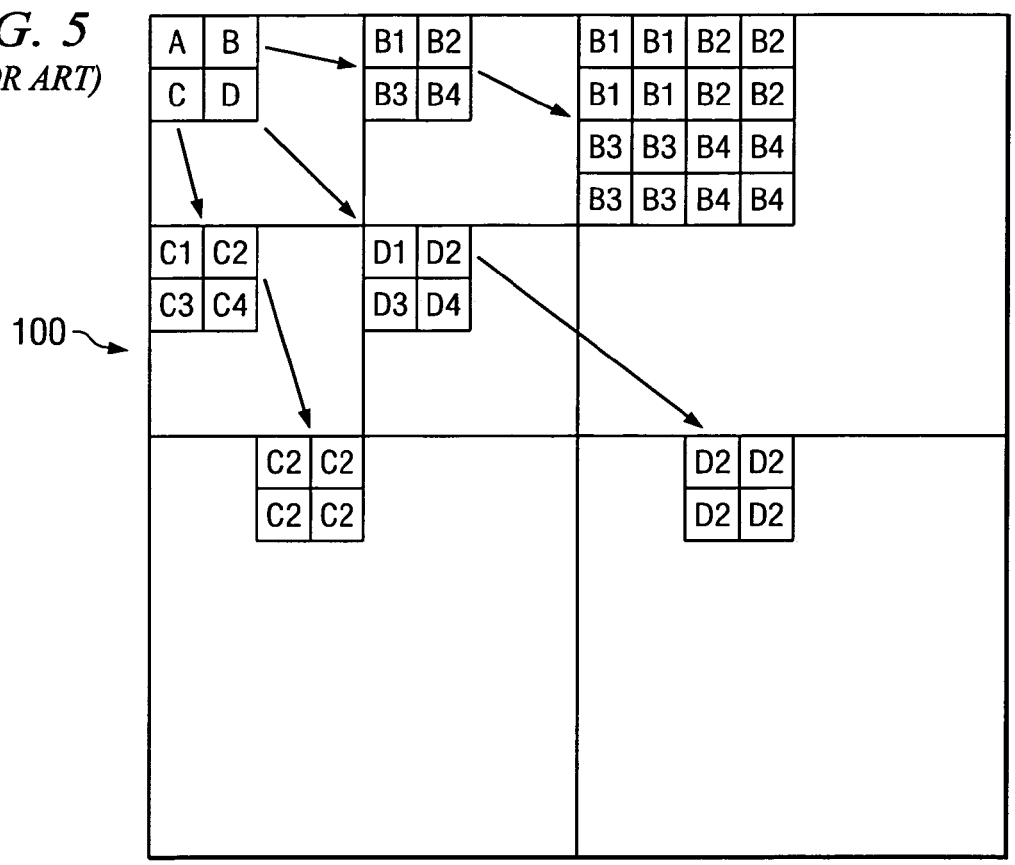
FIG. 5 illustrates scale dependency of wavelet coefficients (Prior Art)
Figure 6:
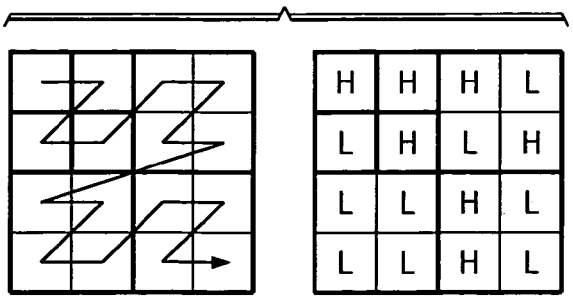
FIG. 6 illustrates an example Morton scanning order and a corresponding set of wavelet coefficients used in a coding example (Prior Art)

FIGS. 7 and 8 illustrate the steps in computing the traditional inverse discrete wavelet transform. FIG. 7 illustrates a vertical stage of the inverse wavelet transform. The wavelet encoded data 200 is supplied to re-sampling filters 211 and 212. Their outputs are filtered by respective high pass filter 221 and low pass filter 222. The result from summer 230 is the partially reconstituted picture 240. FIG. 8 illustrates a horizontal stage of the inverse wavelet transform. The partially decoded data 240 is supplied to re-sampling filters 251 and 252. Their outputs are filtered by respective high pass filter 261 and low pass filter 262. The result from summer 270 is the reconstituted picture 280.

FIGS. 7 and 8 show that the inverse wavelet transform can be viewed as the summation of the outputs from filtering the input low pass and high pass subbands by a factor of 2. This type of interpolation often occurs in conjunction with re-sampling filters. The inverse wavelet transform constitutes an example of increasing the sampling rate by a factor of 2 as compared to the sampling rate of the existing low pass and high pass subbands.

Several factors would facilitate computation of the inverse discrete wavelet transform. It would desirable to avoid explicit interpolate of the data by a factor of 2. The process of interpolation by a factor of M in general involves inserting M−1 zeros between input samples. It would also desirable to implement the inverse wavelet transform to minimize additional control or storage required due to not implementing explicit interpolation. The basic steps are examined for a data sequence and four-tap filter to illustrate the conventional approach and the previous approaches shown in the literature.

Let X represent the data for the approximation coefficients and Y represent the data for the detail coefficients, with X and Y having the same size. Then:

$$X=\{x_0, x_1, x_2, \ldots x_{N-1}\}, Y=\{y_0, y_1, y_2, y_3, \ldots y_{N-1}\}$$

The interpolated data can be viewed as follows:

$$X^{int}=\{x_0, O, x_1, O, x_2, O, x_3, 0, \ldots x_{N-1}\}$$

$$Y^{int}=\{y_0, O, y_1, O, y_2, O, y_3, 0, \ldots y_{N-1}\}$$

The process of interpolation by a Daubechies_4 wavelet can now be viewed as shown in Listing 1:

| Listing 1 | | | |
|---|---|---|---|
| Output Sample 0: | $x_0 h_0$ | + | $y_0 g_0$ |
| Output Sample 1: | $x_0 h_1 + 0 h_0$ | + | $y_0 g_1 + 0 g_0$ |
| Output Sample 2: | $x_0 h_0 + 0 h_1 + x_1 h_0$ | + | $y_0 g_0 + 0 g_1 + y_1 g_0$ |
| Output Sample 3: | $x_0 h_3 + 0 h_2 + x_1 h_1$ | + | $y_0 g_3 + 0 g_2 + y_1 g_1$ |
| Output Sample 4: | $0 h_3 + x_1 h_2 + 0 h_1 + x_2 h_0$ | + | $0 g_3 + y_1 g_2 + 0 g_1 + x_2 g_0$ |
| Output Sample 5: | $x_1 h_3 + 0 h_2 + x_2 h_1 + 0 h_0$ | + | $y_1 g_3 + 0 g_2 + y_2 g_1 + 0 g_0$ | where: $h_i$ is the corresponding low pass filter coefficient; and $g_i$ is the corresponding wavelet filter coefficient.

Kethamawaz and Grisworld (Efficient Wavelet Based Processing, EE Dept. Technical Report 1999) reformulated this computation to be more efficient by formulating the following computation that seeks to maximize the number of multiplies that can be performed by looking across multiple output samples. This is shown in Listing 2.

| Listing 2 | | | | | |
|---|---|---|---|---|---|
| Output Sample 0: | $x_0 h_0 +$ | | | $y_0 g_0$ | |
| Output Sample 1: | $x_0 h_1 +$ | $0 h_0 +$ | | $y_0 g_1 +$ | $0 g_0$ |
| Output Sample 2: | $x_0 h_2 +$ | $0 h_1 + x_1 h_0 +$ | | $y_0 g_2 +$ | $0 g_1 + y_1 g_0$ |
| Output Sample 3: | $x_0 h_3 +$ | $0 h_2 + x_1 h_1 +$ | | $y_0 g_3 +$ | $0 g_2 + y_1 g_1$ |
| Output Sample 4: | | $0 h_3 + x_1 h_2 + 0 h_1 + x_2 h_0 +$ | | | $0 g_3 + y_1 g_2 + 0 g_1 + y_2 g_0$ |
| Output Sample 5: | | $x_1 h_3 + 0 h_2 + x_2 h_1 + 0 h_0 +$ | | | $y_1 g_3 + 0 g_2 + y_2 g_1 + 0 g_0$ |

This reformulation takes an input sample and multiplies it by all the filter taps and stores the partial products. The process is repeated for the next input sample except that its intermediate product is added with the previously computed partial outputs two stages down from the previous iteration as shown in Listing 2. For example $x_1h_0$ is added with the partial product $x_0h_2$, which is the partial output 2 stages away from the previous iteration. This algorithm is a depth first search (DFS) solution to the problem in which every input is used to perform computations across the depth of the wavelet. This algorithm requires access to only one input (horizontal) and one line of input (vertical) case.

This algorithm has several implementation implications when used on a real-time digital signal processor (DSP) with cache. The computed intermediate products are the product of two 16-bit numbers and thus need retained in held in memory at 32-bits. Implementing this algorithm in a vectorized manner requires an output buffer to hold two complete interpolated output lines of the size of the width of the image at 32-bits. This requirement greatly increases the needed storage. Since the algorithm calculates results in a staggered manner after several iterations of accumulation, a separate loop may be required to shift the accumulated outputs from 32-bits back to 16-bits depending on the length of the wavelet. This amount of data needing storage and the amount of read and write traffic degrades performance significantly for most cache architectures.

This invention includes data specific transformations to make the algorithm more cache-friendly. This invention uses an alternative constituting a breadth first search algorithm. This invention requires storage of half the number of inputs (horizontal) and half the number of input lines (vertical) at any given time. The input lines do not need to be the same width as the width of the subband. This feature allows processing the subbands as stripes and trades data cache degradation by adjusting the amount of the working data set. The following example is shown for the Daubechies wavelet (D-4), the wavelet of this example, but is applicable to any wavelet family.

This algorithm has several implementation implications when used on a real-time digital signal processor (DSP) with cache. The computed intermediate products are the product of two 16-bit numbers and thus need retained in held in memory at 32-bits. Implementing this algorithm in a vectorized manner requires an output buffer to hold two complete interpolated output lines of the size of the width of the image at 32-bits. This requirement greatly increases the needed storage. Since the algorithm calculates results in a staggered manner after several iterations of accumulation, a separate loop may be required to shift the accumulated outputs from 32-bits back to 16-bits depending on the length of the wavelet. This amount of data needing storage and the amount of read and write traffic degrades performance significantly for most cache architectures.

This invention includes data specific transformations to make the algorithm more cache-friendly. This invention uses an alternative constituting a breadth first search algorithm. The invention changes the order of computation of the output results. When using dedicated hardware, the prior art trend for increased through put is use an algorithm with a maximum number of multiplies. A special hardware circuit is constructed to simultaneously calculate these multiplications. This results in a process that is efficient from the standpoint of computation hardware. The prior art generally employs such a depth-first computation even when implemented on a programmable digital signal processor. There are disadvantages to this approach. This approach requires storage of large amounts of intermediate data. Often this intermediate data is multiplication products in extra bit form. It is well known that multiplication of two n-bit factors results in a 2n-bit product. The number of such intermediate products are typically greater than can be accommodated in the register set requiring storage in memory or cache. The greater data width of such intermediate products means they cannot be packed into data words as typical for the starting data and filter coefficients. Thus the number and size of intermediate products requires much data transfer traffic between the DSP core and cache increasing the likelihood of cache missing and resort to slower main memory.

The breadth first technique of this invention focuses on immediate calculation of output results. This means that fewer results are computed in parallel but that the latency of each final result is smaller. This smaller latency produces less intermediate data that needs to be stored. Often, as shown below, this smaller amount of immediate data can be completely stored in the register set. This permits rounding and packing the output data in the same manner as the input data is packed. This reduces memory traffic by requiring storage of only output data in packed form. Accordingly, this invention is less likely to generate cache misses that require time consuming memory accesses.

This invention requires storage of half the number of inputs (horizontal) and half the number of input lines (vertical) at any given time. The input lines do not need to be the same width as the width of the subband. This feature allows processing the subbands as stripes and trades data cache degradation by adjusting the amount of the working data set. The following example is shown for the Daubechies wavelet (D-4), the wavelet of this example, but is applicable to any wavelet family.

This invention partitions the existing low pass filter H and the wavelet filter G into two sub-filters each as shown:

$$H=\{H_0, H_1, H_2, H_3\} \equiv H^{ev}=\{H_0, H_2\}, H^{od}=\{H_1, H_3\}$$

$$G=\{G_0, G_1, G_2, G_3\} \equiv G^{ev}=\{G_0, G_2\}, G_{od}=\{G_1, G_3\}$$

Thus this invention uses a poly-phase scheme to implement the transformation. The first output sample is produced by taking half the number of inputs from each subband and convolving with the respective even filters. The second output sample uses the same inputs, but convolves with the odd filter. This algorithm produces outputs required for steady state only, so only output samples starting at output sample 2 are valid. This algorithm can be extended to produce the filtered output samples at startup by pre-appending the sequence with zeroes. This modification is not required since the inverse transform only deals with steady state outputs. This is shown in Listing 3.

The above output computation can now be simplified by elimination of the zero data terms as shown in Listing 4.

Listing 3

| | | | | |
|---|---|---|---|---|
| Output Sample 2: | $x_0h_2 +$ | $0\,h_1 + x_1h_0 +$ | $y_0g_2 +$ | $0\,g_1 + y_1g_0$ |
| Output Sample 3: | $x_0h_3 +$ | $0\,h_2 + x_1h_1 +$ | $y_0g_3 +$ | $0\,g_2 + y_1g_1$ |
| Output Sample 4: | $0\,h_3 +$ | $x_1h_2 + 0\,h_1 + x_2h_0 +$ | | $0\,g_3 + y_1g_2 + 0\,g_1 + y_2g_0$ |
| Output Sample 5: | | $x_1h_3 + 0\,h_2 + x_2h_1 +$ | | $y_1g_3 + 0\,g_2 + y_2g_1 + 0\,g_0$ |

Listing 4

| Output Sample 2: | $x_0 h_2 +$ | $x_1 h_0 +$ | $y_0 g_2 +$ | $y_1 g_0$ |
| Output Sample 3: | $x_0 h_3 +$ | $x_1 h_1 +$ | $y_0 g_3 +$ | $y_1 g_1$ |
| Output Sample 4: | | $x_1 h_2 + x_2 h_0 +$ | | $y_1 g_2 + y_2 g_0$ |
| Output Sample 5: | | $x_1 h_3 + x_2 h_1 +$ | | $y_1 g_3 + y_2 g_1$ |

This can be re-written using the "*" symbol to denote the convolution operator and the poly-phase filters $H^{ev}$, $H^{od}$, $G^{ev}$ and $G^{od}$ as shown in Listing 5 to represent the underlying math.

Listing 5

| Output Sample 2: | $\{x_0, x_1\} * H^{ev} + \{y_0, y_1\} * G^{ev}$ |
| Output Sample 3: | $\{x_0, x_1\} * H^{od} + \{y_0, y_1\} * G^{od}$ |
| Output Sample 4: | $\{x_1, x_2\} * H^{ev} + \{y_1, y_2\} * G^{ev}$ |
| Output Sample 5: | $\{x_1, x_2\} * H^{od} + \{y_1, y_2\} * G^{od}$ |

An analysis of these equations shows that the number of multiplies required to produce an output sample are half the length of the associated scaling and wavelet filter. The elimination of the useless multiplies with the inserted zero data produces this result. Thus, the current method achieves efficient utilization of the inputs with the concurrent evaluation of the outputs in a non-staggered (one-shot) manner. In addition the input advances by one input (horizontal) or one input line (vertical) at a time. This permits some data re-use. This also removes the need for temporary buffering of the accumulated 32-bit precision results. The non-staggered method of computation produces complete results at the end of every iteration. The accumulated results can be held in the register file prior to shifting them down to 16-bits. This eliminates the need for additional storage of 32-bit products, resulting in a substantial improvement in cache performance.

Figure 9:
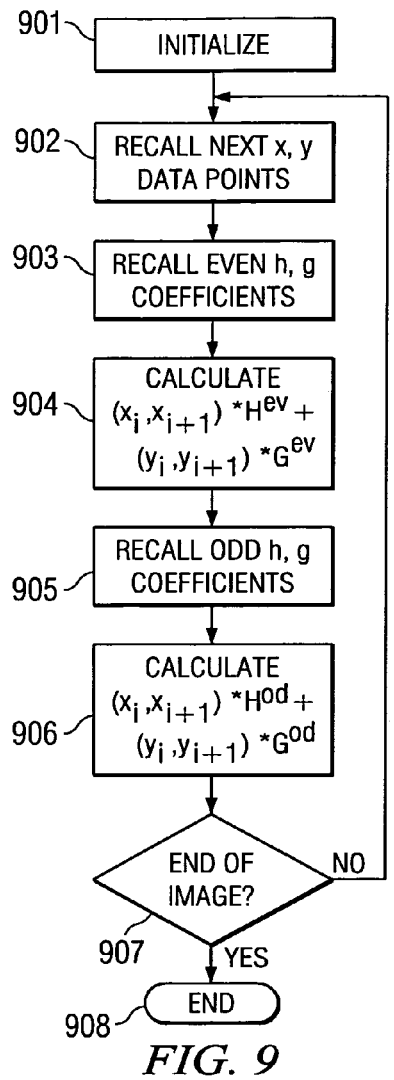
FIG. 9 illustrates the algorithm of this invention in flow chart form.
Figure 12:
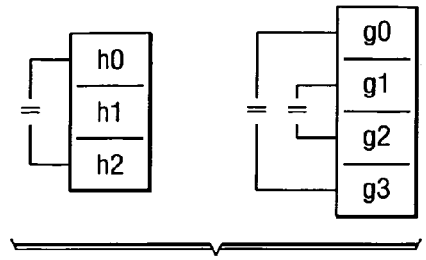
FIG. 12 illustrates the equal symmetrical pairs of coefficients in a first part of a Vertical Stage of the Antonini Inverse 9-7 JPEG2000 Wavelet Transform.
Figure 13:
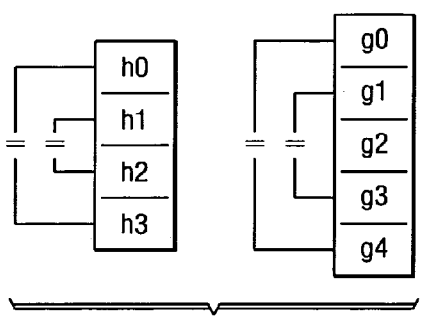
FIG. 13 illustrates the equal symmetrical pairs of coefficients in a second part of a Vertical Stage of the Antonini Inverse 9-7 JPEG2000 Wavelet Transform.

FIG. 9 illustrates this algorithm in flow chart form. The process initiates in block 901. The next data is recalled in block 902. The even coefficients in h and g are recalled in block 903. The convolution and sum as shown in Listings 4 and 5 is performed in block 904. As shown in Listing 4 this convolution-sum calculation requires four multiplies and three sums. The manner of performing this operation will be described further below. The odd coefficients in h and g are recalled in block 905. Block 906 performs the convolution-sum using the odd coefficients. Decision block 907 determines if the computation has reached the end of the image. If so (Yes at decision block 907), then the inverse discrete wavelet transform is complete and the process ends at end block 908. If not (No at decision block 907), process control passes back to block 902 to recall the next x and y data points.

The manner of computing the convolution-sums of blocks 904 and 906 depends upon the instruction set of the digital signal processor doing the computation. Several examples will be described below. In these examples assume that the x and y data is 16-bits with adjacent x and adjacent y data points packed into a 32-bit data word. The h and g coefficients are also assumed to be 16-bits each packed into 32-bit data words. Assume that coefficients $h_0$ and $h_2$, and $g_0$ and $g_2$ are packed into corresponding even data words and coefficients $h_1$ and $h_3$, and $g_1$ and $g_3$ are packed into corresponding odd data words.

In the simplest instruction set case, no complex multiply-sum instructions are available. The Texas Instruments TMS320C6000 family of digital signal processors includes four 16-bit by 16-bit multiply instructions. These four instructions employ a selected 16-bit half of each of two input operands and form a 32-bit product. The four instructions include: 1) least signification 16-bits of the first operand times the least significant 16-bits of the second operand; 2) least signification 16-bits of the first operand times the most significant 16-bits of the second operand; 3) most signification 16-bits of the first operand times the least significant 16-bits of the second operand; and 4) most signification 16-bits of the first operand times the most significant 16-bits of the second operand. The four multiplications are performed using appropriate ones of these four multiply instructions. Each of these products is stored in a 32-bit general purpose register. The four products are summed in three add operations. Care must be taken to avoid or recover from any overflow during these sums. The final sum is right then shifted 16 bits to retain the most significant bits. This final sum is packed into a 32-bit data register with another final sum for output as two packed 16-bit output data points. Some digital signal processors include pack instructions which can do this final packing operation in one instruction cycle. If no such instruction is available, then the packing can take place as follows. One of the 16-bit data words is left shifted 16-bits into the 16 most significant bits of a data word. This left shifted data word and the other data word (with the 16 most significant bits set as zeros) are logically ANDed. This effectively packs the two output data points in the most significant and least significant halves of the 32-bit data word.

This method employs 8 or 9 instructions not counting dealing with sum overflow. These are four multiplies, three adds and a single pack operation or a shift operation followed by a logical AND operation. The TMS320C6000 includes two separate data paths, each with a multiply unit. Thus the x computation could be done by the A data path and the y computation could be done by the B data path. Since two multiplies and four arithmetic/logical operations can be dispatched each instruction cycle, a pipelined software loop may be able to compute one output data point for each two instruction cycles. The number of general purpose data registers required by an inner loop should be well within the 16 general purpose data registers for each data path.

Other digital signal processors have advanced instructions permitting faster operation. The Texas Instruments TMS320C6400 digital signal processor includes an instruction called Dot Product With Shift and Round, Signed by Unsigned Packed 16-Bit (DOTPRSU2). The operation of this instruction is illustrated in FIG. 10. The most significant and least significant halves of the first source operand (Source 1) are multiplied by the corresponding most significant halves of the second source operand (Source 2). The two products are added and rounded by addition of a "1" bit in the 15 bit position (hex8000). Then sum is right shifted by 16 bits. The most significant bits are sign extended, that is filled with 1's if the most significant bit is 1 and filled with 0's if the most significant bit is 0. This instruction performs half the convolution-sum computation required. This instruction requires the first operand to be a signed number. The x and y data would typically be pixels and therefore unsigned data. However, the h and g coefficients could easily be signed numbers. The multiply-sum quantities for the x data and the y data would be added and then right shifted and packed into 16-bits.

The DOTPRSU2 is a multi-cycle instruction requiring for instruction cycles to complete. However, it can be fully pipelined with a new instruction started every cycle. Because each multiply unit in the TMS320C6400 can complete one convolution each cycle, this data signal processor can be software pipelined to produce one output data point per instruction cycle.

Analysis reveals that this technique will work for odd-tap filter wavelets like the JPEG2000 9-7 wavelet. The first output sample is the one where the input is convolved with the odd poly-phase filter, and the second output sample is the one convolved with the even poly phase filter. This ordering of coefficients is exactly opposite to the order for even tap wavelets (D-4) where the first output sample is the one where the input is convolved with the even poly-phase filter and the second output sample is the one where the input is convolved with the odd poly-phase filter. The use of this technique can be shown to be general and applicable for other interpolation factors that often arise in the context of re-sampling.

Listings 6 and 7 are example loop kernels incorporating this invention in scheduled assembly code for the Texas Instruments TMS320C62x digital signal processor for the Vertical Stage of the Antonini Inverse 9-7 JPEG2000 Wavelet Transform. Listing 6 is for the 7 data term case and listing 7 is for the 9 data term case. Note that each listing computes two separate output samples per iteration.

LISTING 6

```
LOOP:      ;
A0         ADD      .S2X    B6,A8,B4          ; acc3_l += t16
A1 ||      ADD      .L1X    B4,A4,A4          ;
A2 ||      ADD2     .S1     A9,A7,A9          ; _add2(w2, w0)
A3 ||      LDW      .D2T2   *B9++,B10         ; in_hig[1][2*i]
A4 ||      LDW      .D1T1   *A0++,A9          ; in_low[2][2*i]
B0         ADD      .L1     A3,A4,A4          ; acc1_l + acc1_h
B1 ||      ADD      .L2     B4,B11,B4         ; acc3_l += t17
B2 ||      ADD      .S2X    B5,A7,B5          ;
B3 ||      MPYLH    .M1     A9,A5,A3          ; t12 = t2*h1
B4 ||      ADD2     .S1X    A8,B10,A8         ; _add2(v2, v1)
B5 ||      MPYH     .M2     B3,B0,B11         ; _hi(t3) * h3
B6 ||      LDW      .D1T1   *A10++,A8         ; in_hig[2][2*i]
B7 ||      LDW      .D2T2   *B7++,B3          ; in_low[1][2*i]
C0         ADD      .L2     B4,B5,B4          ; acc3_l + acc3_h
C1 ||      SHR      .S1     A4,0xf,A4         ;
C2 ||      ADD2     .S2X    B10,A3,B3         ; _add2(v3, v0)
C3 ||      MPYLH    .M1     A8,A6,A4          ; t4 = p3 * g3
C4 ||      MPYLH    .M2     B3,B0,B5          ; t13 = w1*h3
C5 ||      LDW      .D1T1   *A11++,A3         , in_hig[0][2*i]
C6 ||      LDW      .D2T2   *B8++,B10         ; in_hig[3][2*i]
D0         SHR      .S2     B4,0xf,B4         ;
D1 || [!A2] STH     .D2T1   A4,*B1++(4)       ; outp[0] = acc1s
D2 || [A1] ADD      .D1     0xffffffff,A1,A1  ; it--
D3 ||      MPYH     .M1     A9,A5,A8          ; _hi(t2) * h1
D4 ||      ADD      .S1X    A3,B6,A3          ; acc0_l += t10
D5 ||      MPYLH    .M2     B3,B2,B4          ; t3 = p2 * g1
E0  [A2]   SUB      .L1     A2,1,A2           ;
E1 || [!A2] STH     .D2T2   B4,*-B1(2)        ; outp[1] = acc3s
E2 ||      MPYH     .M2     B3,B2,B5          ; t3 = p2 * g1
E3 ||      MPYH     .M1     A8,A6,A7          ; t4 = p3 * g3
E4 ||      ADD      .S1X    A3,B5,A3          ; acc0_l += t10
E5 || [A1] B        .S2     LOOP              ;
E6 ||      LDW      .D1T1   *A12++,A7         ; in_low[0][2*i]
```

LISTING 7

```
LOOPH:     ; PIPED LOOP KERNEL
F0  [B0]   B        .S1     LOOPH             ;
F1 ||      ADD      .L1X    B13,A9,A9         ;
F2 ||      ADD      .L2X    B4,A7,B5          ; acc0_h += th2
F3 ||      MPYHL    .M1     A1,A10,A5         ; th2 = v2 * g4
F4 ||      LDW      .D1T1   *A11++,A8         ; in_low[2][2*i]
F5 ||      LDW      .D2T2   *B10++,B6         ; in_hig[1][2*i]
F6 ||      ADD2     .S2     B5,B6,B6          ; _add2(v3, v1)
G0         ADD      .L1     A9,A5,A0          ; acc2_h += th7
G1 ||      ADD      .L2     B8,B5,B5          ; acc0_l + acc0_h
G2 ||      LDW      .D1T1   *A12++,A0         ; in_low[0][2*i]
G3 ||      ADD2     .S2X    B4,A0,B4          ; _add2(w3, w0)
G4 ||      LDW      .D2T2   *B3++,B5          ; in_hig[3][2*i]
G5 ||      MPYHL    .M1     A8,A4,A3          ; _hi(t0) * h2
G6 ||      MPY      .M2     B6,B12,B13        ; p0 * g2
H0         ADD      .L1     A3,A0,A8          ; acc2_l + acc2_h
H1 ||      SHR      .S2     B5,0xf,B5         ;
H2 ||      ADD2     .S1     A9,A2,A9          ; _add2(v4, v0)
H3 ||      LDW      .D1T1   *A15++,A2         ; in_hig[0][2*i]
H4 ||      LDW      .D2T2   *B1++,B4          ; in_low[3][2*i]
H5 ||      MPYHL    .M2     B4,B11,B4         ; _hi(t1) * h0
H6 ||      MPY      .M1     A8,A4,A8          ; t10 = t0*h2
I0         SHR      .S1     A8,0xf,A0         ;
I1 ||      STH      .D2T2   B5,*B9++(4)       ; acc0s
I2 ||      LDW      .D1T1   *A13++,A9         ; in_hig[4][2*i]
I3 ||      MPY      .M2     B4,B11,B5         ; t11 = t1*h0
I4 ||      ADD      .L1X    A3,B7,A3          ; acc2_l += t14
I5 ||      MPY      .M1     A9,A6,A9          ; th1 = p1 * g0
J0  [B0]   ADD      .L2     0xffffffff,B0,B0  ; it--
J1 ||      ADD      .S1X    A3,B4,A3          ; acc2_l += t15
J2 ||      MPYHL    .M2     B6,B12,B13        ; th0 = p0 * g2
J3 ||      ADD      .S2X    B7,A8,B4          ; acc0_l += t10
J4 ||      MPYHL    .M1     A9,A6,A9          ; th1 = p1 * g0
J5 ||      LDW      .D2T2   *B2++,B8          ; in_low[1][2*i]
J6 ||      LDW      .D1T1   *A14++,A1         ; in_hig[2][2*i]
K0         STH      .D2T1   A0,*-B9(2)        ; acc2s
K1 ||      ADD      .L2     B4,B5,B8          ; acc0_l += t10
K2 ||      ADD      .S2X    B13,A9,B4         ;
K3 ||      MPY      .M1     A1,A10,A7         ; th2 = v2 * g4
K4 ||      ADD2     .S1X    A8,B8,A8          ; _add2(w2, w1)
```

The TMS320C62X is an 8-way very long instruction word (VLIW) processor employing two separate datapaths/register files with limited cross path capability. The eight execution units include data units D1 and D2, logic units L1 and L2, multiply units M1 and M1 and arithmetic units S1 and S2. The "1" units use the A register file and the "2" units use the B register file with limited cross connection. The instruction mnemonics are interpreted as follows. The initial symbol "||" indicates this instruction executes in parallel with the immediately prior instruction. All instructions can be made conditional. This listing only notes those instructions that are conditional. The next symbol in square brackets "[ ]" indicates the predicate register and the "!" symbol indicated inverted logic. Next is the instruction type mnemonic, then the execution unit (D, L, M and S). An "X" suffix on the execution unit designator indicates the use of a crosspath transferring an operand from a register file opposite that of the execution unit. The operand list is last. This operand list is source1, source2, destination except for loads and stores and immediate operands.

The process is initialized via instructions not shown in these loop kernels. Only one of the loops of Listings 6 and 7 is used dependent upon whether this loop is operating on 7 input samples (Listing 6) or nine input samples (Listing 7) in the 9-7 scheme. This initialization includes storing the following constants. In Listing 6: h1 in register A5; h3 in register B0; g1 in register B2; g3 in register A6; the initial data addresses in registers A0, A10, A11, A12, B7, B8 and B9. In Listing 7: h0 in register B11; h2 in register A4; g0 in register A6; g2 in register B12; g4 in register A10; the initial data addresses in registers A11, A12, A13, A14, A15, B1, B2, B3 and B10.

Listing 6 has five execute packets (A, B, C, D and E) having five to eight numbered instructions. Listing 7 has six execute packets (F, G, H, I, J and I) having five to seven numbered instructions. Following initialization the proper loop is selected. The loop kernels include load 32-bit word instructions for loading the data. This data is 16-bit data with two data points packed in each 32-bit word. Listing 6 includes 7 LDW instructions at A3, A4, B6, B7, C5, C6 and E6. Listing 7 includes 9 LDW instructions at F4, F5, G2, G4, H3, H4, I2, J5 and J6. These load instructions use an indirect address stored in respective source registers (B9, A0, A10, B7, A11, B8 and A12 for Listing 6 and A11, B10, A12, B3, A15, B1, A13, B2 and A14 for Listing 7). The "*R++" address mode post increments the address register. The address stored in the address register increments to point to the next 32-bit data word following the data fetch. The sets the address registers to point to and fetch sequential 32-bit words in memory. The corresponding destination registers thus store two packed 16-bit data words.

Figure 11:
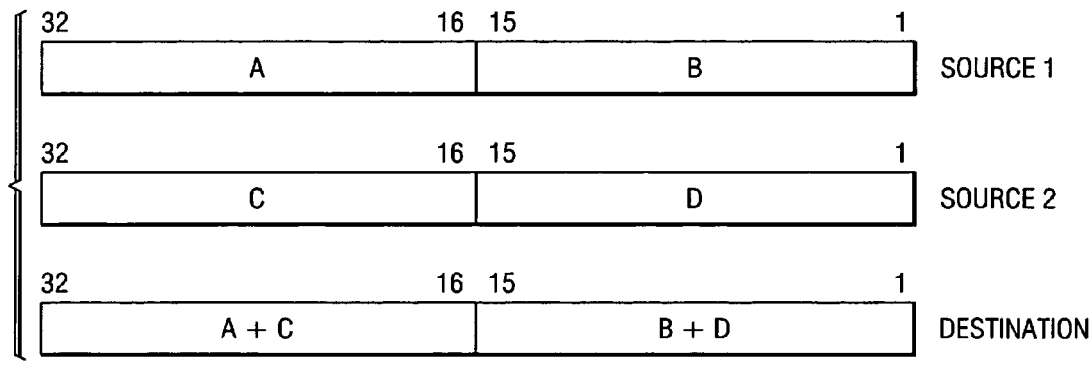
FIG. 11 illustrates the operation of a dual addition instruction that is useful in this invention (Prior Art)

Each loop kernel adds some data using the ADD2 instruction (Listing 6 at instructions A2, B4 and C2 and Listing 7 at instructions F6, G3, H2 and K4.) Operation of the ADD2 instruction is illustrated in FIG. 11. The ADD2 instruction separately adds the 16-bit upper and lower parts of the source operands. If the lower sum B+D overflows and generates a carry, that carry does not propagate to the upper sum A+C. This uses the distributive property of multiplication over addition and a property of the coefficients in the Antonini Inverse 9-7 JPEG2000 Wavelet Transform. These coefficients are equal in symmetrical pairs. For example, in Listing 6 the coefficients h0 and h2 are equal and the coefficients g0 and g3 are equal and the coefficients g1 and g2 are equal. The filter calculation includes:

$$prod1 = x_0 h_0 + x_2 h_2$$

Let $h_0 = h_2 = h$, so:

$$prod1 = x_0 h + x_2 h$$

$$prod1 = h(x_0 + x_2)$$

The original calculation requires two multiplications and one addition. The algebraically transformed calculation requires one addition and one multiplication. Performing the data addition before the multiplication permits the elimination of one multiplication. Since multiplication hardware is at a premium on the TMS320C62x digital signal processor relative to addition hardware, this serves to reduce number of instructions for each iteration of the loop.

Next comes the filter multiplications. These multiplications are at instructions B3, B5, C3, C4, D3, D5, E2 and E5 in Listing 6 and instructions F3, G5, G6, H5, H6, I3, I5, J2, J4 and K3 in listing 7. The algebraic transformation eliminated 6 of 14 multiplies in Listing 6 and 8 of 18 multiplies in Listing 7. These multiplications include a mixture of MPY, MPYH, MPYLH and MPYHL as required to select the proper pair of 16-bit operands in the packed 32-bit words. The 32-bit product results are stored in respective data registers as 32-bit quantities.

The next process is the addition for accumulation. These additions take place separately for the two output samples. In Listing 6 the accumulations are at instructions A0, A1, B0, B1, B2, C0 and E4. In Listing 7 the accumulations are at instructions F1, F2, G0, G1, H0, I4, J1, J3, K1 and K4.

Each listing then rounds the accumulations by right shifting 15 bits. These instructions are instructions C1 and D0 in Listing 6 and instructions H1 and I0 in Listing 7.

The results are stored via STH instructions D1 and E1 in Listing 6 and instructions I1 and K0 in listing 7. The STH instruction stores the 16 least significant bits of the source register into the memory address specified in the address register. Instructions D1 and I1 use the addressing form "*R++(4)" which specifies auto increment of the address register after the store operation by 4 bytes (32 bits). Instructions E1 and K0 use the addressing form "*-R(2)" which provides a negative offset of 2 bytes before the store operation. This effectively packs two 16-bit results into a single 32-bit data word.

Listing 6 includes a prolog collapse technique. The two store instructions STH D1 and E1 are made conditional upon register A2 being zero. Register A2 is decremented in subtract instruction E0 whenever the register is non-zero. The main steady-state loop can serve the prolog initialization function of filling the intermediate results before steady state is reached. During these prolog iterations of the main loop the results are invalid. Making the store instructions conditional prevents these initial, invalid results from being stored. The register A2 is initiated with an integer equal to the number of such prolog iterations of the loop. In this example register A2 is initialized as "2." The subtract instruction E0 decrements register A2 for this number of loops. During the prolog loops the conditional store instructions D1 and E1 are not executed. When register A2 is decremented to zero, subtract instruction E0 is disabled and the store instructions D1 and E1 are enabled.

Listing 6 and 7 include loop control instructions. The loop control instructions in Listing 6 are instructions D2, E0 and E5. Instruction D2 effectively decrements the loop variable stored in register A1. Instruction E5 branches to the beginning of the loop (LOOP) when register A1 is non-zero. When register A1 has decremented to zero, instruction E5 exits the loop to the next instruction, which is outside the loop kernel of Listing 6. Instruction E0 decrements the contents of register A2. Making the STH instructions D1 and E1 conditional on A2 being zero ([!A2]). The loop control instructions in Listing 7 are instructions J0 and F0. Instruction J0 effectively decrements the loop variable stored in register B0. Instruction F0 branches to the beginning of the loop (LOOPH) when register B0 is non-zero. When register B0 has decremented to zero, instruction F0 exits the loop to the next instruction, which is outside the loop kernel of Listing 7.

Table 1 lists a summary of the loop kernels of Listing 6 and 7.

TABLE 1

| Instruction Type | Listing 6 | Listing 7 |
| --- | --- | --- |
| Load Data | 7 | 9 |
| Preliminary Add | 3 | 4 |
| Multiplication | 8 | 10 |
| Accumulation | 8 | 10 |
| Rounding | 2 | 2 |
| Store Data | 2 | 2 |
| Loop Control | 3 | 2 |
| Total Instructions | 33 | 39 |
| Fetch Packets | 5 | 6 |

Listings 6 and 7 are merely examples of implementation of this algorithm on a particular data processor architecture. One skilled in the art would realize that the method of this invention is readily practiced on other data processor architectures. One essential feature is storing only packed data in the memory only. The memory stores the input data as packed data. The filter results are likewise stored as packed data into the memory. This feature reduces the memory size needed and reduces the number of required memory accesses.

This invention is also applicable to other filtering processes than the inverse Wavelet Transform. For example, conversion of an image to a different size could use this technique. In up-sampling (conversion to a larger image size) the input coefficients in the filter function will often be zero. In accordance with this invention, these multiplications are omitted from performance. The breadth-first computation technique is also useful in this application. Other applications include audio time-warping which changes the run-time of an audio file without changing its pitch.

What is claimed is:

1. A method for inverse Wavelet transform comprising the steps of:

storing input data as subwords packed within data words in a memory;

calculating output data in a software loop in a breadth-first fashion by recalling input data and filter coefficients for computation of at least one output data for each iteration of the software loop even if the same input data is used in a later iteration for calculating other output data;

storing calculated output data as subwords packed within data words in the memory.

2. The method of claim 1, wherein:

said step of calculating output data in a software loop includes scheduling multiplications between input data and corresponding non-zero filter coefficients and not scheduling multiplications between input data and corresponding zero filter coefficients.

3. The method of claim 1, wherein:

said step of calculating output data in a software loop includes calculating output data from input data and corresponding even filter coefficients, and calculating output data from input data and corresponding odd filter coefficients.

4. The method of claim 1, wherein:

said step of calculating output data in a software loop includes for each level of wavelet encoding calculating an expansion of vertical spatial frequency, and thereafter calculating an expansion of horizontal spatial frequency.

5. The method of claim 1, wherein:

said method is preformed upon a data processor having data cache of a predetermined memory capacity;

said method further comprising the step of processing an image as sub-band stripes having a size selected corresponding to said predetermined memory capacity of said data cache.

6. The method of claim 1, wherein:

said filter coefficients include at least one pair of equal filter coefficients;

said method further comprising the steps of:

adding pairs of input data to be multiplied by a corresponding pair of equal filter coefficients; and multiplying a sum of said pairs of input data by said corresponding equal filter coefficient.

7. The method of claim 6, wherein:

said step of adding pairs of input data includes simultaneously separately adding differing portions of input data packed into a single memory word generating separate sums packed into a single memory word.

* * * * *